United States Patent

[11] 3,554,216

[72] Inventor Pierre Piguet
 Onex, Switzerland
[21] Appl. No. 771,164
[22] Filed Oct. 28, 1968
[45] Patented Jan. 12, 1971
[73] Assignee Ateliers Des Charmilles S. A.
 Geneva, Switzerland
 a Swiss company
[32] Priority Nov. 7, 1967
[33] Switzerland
[31] No. 15625/67

[54] VALVE, PARTICULARLY SUITABLE FOR PRESSURE PIPING
 4 Claims, 1 Drawing Fig.
[52] U.S. Cl..................................................... 137/315,
 251/171, 251/285, 251/307, 251/363
[51] Int. Cl. ......................................................F16k 43/00,
 F16k 1/22
[50] Field of Search........................................... 137/315;
 251/142, 159, 170, 171, 173, 285, 306, 304, 307,
 361, 363

[56] References Cited
UNITED STATES PATENTS
3,144,040 8/1964 White............................ 137/315
3,156,445 11/1964 Swain............................ 251/307X Primary Examiner—William F. O'Dea
Assistant Examiner—David R. Matthews
Attorney—Waters, Roditi, Schwartz & Nissen ABSTRACT: A valve has an axially movable sleeve carrying a valve seat, and for axial bolts and radial screws axially adjusting the position of the sleeve and for adjusting the roundness of the seat respectively.

PATENTED JAN 12 1971
3,554,216
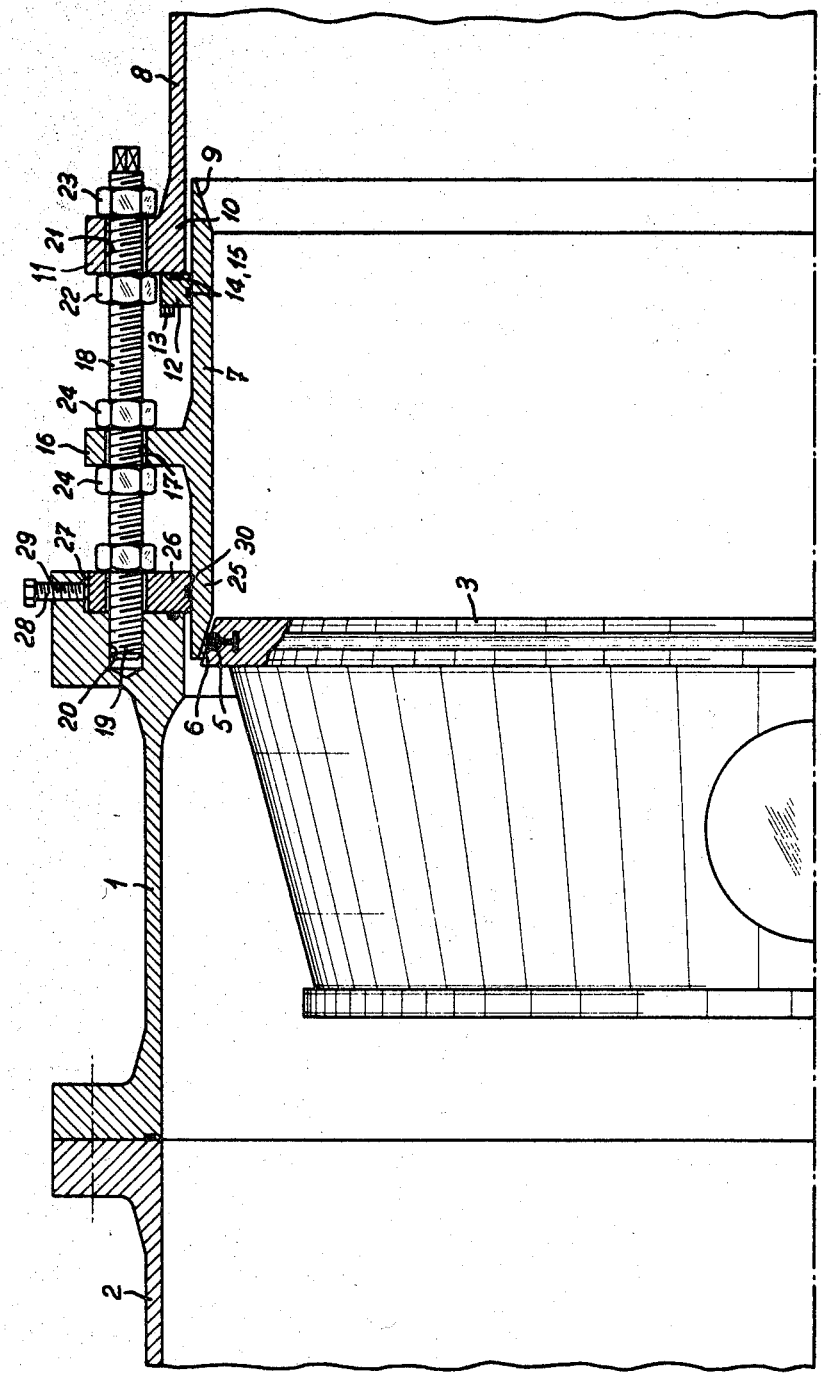

3,554,216

VALVE, PARTICULARLY SUITABLE FOR PRESSURE PIPING

BACKGROUND OF THE INVENTION

The present invention relates to a valve, particularly for pressure piping, having a dismantling sleeve that constitutes part of the pressure piping.

SUMMARY OF THE INVENTION

An object of the invention is to provide a valve incorporating a dismantling sleeve that can be moved axially with respect to the pressure piping and the valve case.

Another object of the invention is to provide such with means for centering the end of the dismantling sleeve that carries the valve seat, and for making this end round.

These and other objects of the invention will be apparent from the following detailed description of one embodiment of the invention.

BRIEF DESCRIPTION OF THE DRAWING

The invention will be described, with reference to the accompanying single FIG. of the drawing, which is a side view, partly cut away, of the valve of the invention incorporated in a pressure pipe.

DESCRIPTION OF THE PREFERRED EMBODIMENT

With reference to the FIG., the valve shown comprises a case 1 fixed against the upstream part 2 of a pressure pipe. Arranged within the case is an obturator 3 for blocking the fluid flow, the obturator in the embodiment illustrated consisting of a disc-shaped butterfly leaf, suitably shaped in cross section. It will be expressly understood that the invention is applicable to valves having other kinds of obturators. A sealing ring 5, composed of rubber or of a soft synthetic plastic, is located in the periphery of the obturator. In the closed position of the valve, shown in the drawing, the sealing ring presses against a seat 6 fixed on the stationary part of the valve. This seat is called the service seat.

To enable the seat 6 to be adjusted in position with respect to the periphery of the obturator 3 and to the sealing ring 5, the seat is carried by a sleeve 7 which, in the embodiment shown, composes a section of the pressure pipe and which connects the upstream part 2 to the downstream part 8 of this pipe. This sleeve is used as a dismantling sleeve when repairing the valve. The end 9 of the sleeve slides in the end 10, formed by a flange 11, of the downstream part 8 of the pressure pipe. A ring 12, held against the flange 11 by screws 13, incorporates two grooves 14, in each of which is held a sealing ring 15 which provides a seal between the end 10 and the part 9 of the sleeve 7.

Ears 16 are provided on the outer surface of the sleeve 7. Openings 17 in these ears accept parallel, threaded bolts 18, of which the ends 19 are screwed into respective threaded holes 20 embodied in the valve case 1. The other ends of the bolts 18 pass through an opening 21 in the flange 11. The nuts 22 and 23 enable the forces present to be transferred between the upstream part 2, or the valve case 1, and the downstream part 8. Two nuts 24 located on either side of the ears 16 can be turned along the bolts 18, so as to move the sleeve 7 axially, and thereby adjust the position of the seat 6.

To permit the end 25 of the sleeve 7 to be centered with respect to the seat 6, the valve case 1 is provided with an adjustable centering arrangement, comprising a centering ring 26 which surrounds the sleeve 7 near the end 25 thereof carrying the seat 6. The ring 26 is located in a recess 27 in the valve case 1. A series of screws 28, engaged in individual, radially extending threaded holes 29 provided in the valve case 1, permit the ring 26 to be moved radially, and thereby to make the seat 6 circular. This feature is particularly advantageous with pipes of large cross section that easily distort under their own weight. A sealing ring 30 held in the ring 26 ensures a good seal between the sleeve end 25 and the ring 26.

The valve described is used in the following way. In operation, after having adjusted the axial position of the seat 6 with respect to the obturator 3, the valve can be used as an ordinary butterfly valve; in other words, the valve is closed when the obturator 3 is positioned crosswise to the central channel of the valve, the sealing ring 5 pressing against the service seat 6. When the seat 6 or ring 5 must be replaced or repaired, the pressure pipe 2 is closed off by an auxiliary valve positioned upstream or by an auxiliary seat incorporated in the same valve. The dismantling sleeve 7 is shifted downstream by turning the nuts 24 on the bolt 18. The sealing ring 5 can be replaced after having removed a holding plate, not shown, mounted against the obturator 3 by screws, for example, which are also not shown in the FIG.

Before the valve is again used, the axial position of the seat 6 must be adjusted; and the seat must be centered, in the way previously described.

The specialist in the art will understand that the construction admits of a variety of changes, all lying within the scope of the invention, depending on whether the invention is applied to a butterfly valve, a valve with an axially movable obturator, or a spherical valve with a tubular obturator that is moved angularly between its open and closed positions.

Although a preferred embodiment of the invention has been described, the scope of, and the breadth of protection afforded to, the invention are limited solely by the appended claims.

I claim:

1. A valve for pressure piping comprising a dismantling sleeve constituting part of the piping, said sleeve having opposite ends and including a valve service seat at one end of said dismantling sleeve, an obturator for opening and closing the valve and which seats on said valve service seat when the valve is closed, a case for the valve, said dismantling sleeve being approximately round in cross section, adjustable centering means on said case for making the end of said dismantling sleeve carrying said valve seat round, and means for mounting said dismantling sleeve for axial adjustment with respect to the pressure piping and to said case and comprising a plurality of external ears spaced around the circumference, and on the outer surface, of said dismantling sleeve, a plurality of parallel threaded bolts freely passing through said ears, a series of threaded holes in said valve body into which one of the ends of said bolts are screwed, a flange on the pressure piping for releasably holding the other ends of said bolts, and nuts screwed onto said bolts and located on either side of each of said ears for permitting axial adjustment of said dismantling sleeve and the service seat carried thereby, by changing the positions of said nuts on said bolts.

2. A valve as claimed in claim 1, wherein said adjustable centering means comprises a centering ring surrounding said dismantling sleeve near the end thereof with said service seat, and a plurality of circumferentially spaced, radially extending screws in said valve case and surrounding said centering ring for moving the latter radially to press against said dismantling sleeve to make the sleeve round and to center the sleeve.

3. A valve as claimed in claim 2, wherein said dismantling sleeve is located within said valve case and the pressure piping, said valve case having a recess receiving said centering ring, a plurality of threaded holes in said valve case circumferentially surrounding said recess for receiving said plurality of screws, and sealing means for ensuring a fluidtight connection between said valve case and the pressure piping, on the one hand, and said dismantling sleeve on the other hand.

4. A valve as claimed in claim 3, wherein the pressure piping includes two spaced sections between which the valve is located, and said dismantling sleeve connects the two sections together.